M. CZINER.
Apparatus for Making Extracts and Distilling Liquid
No. 216,557. Patented June 17, 1879.
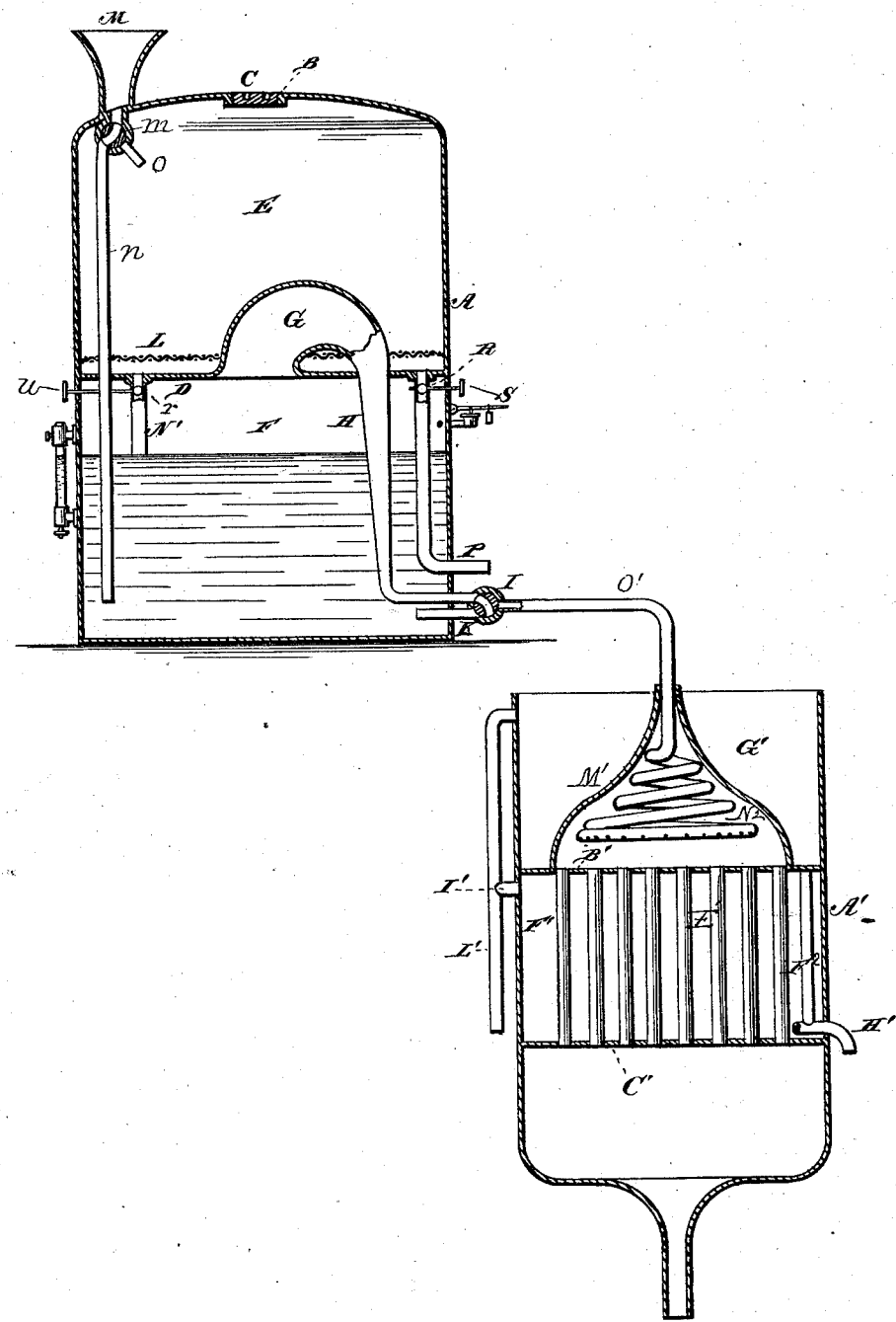
WITNESSES
INVENTOR

UNITED STATES PATENT OFFICE.

MATYAS CZINER, OF STAPLETON, ASSIGNOR OF ONE-HALF HIS RIGHT TO ROBERT WILLIAM PROCTER, OF RICHMOND COUNTY, NEW YORK.

IMPROVEMENT IN APPARATUS FOR MAKING EXTRACTS AND DISTILLING LIQUIDS.

Specification forming part of Letters Patent No. 216,557, dated June 17, 1879; application filed May 1, 1879.

*To all whom it may concern:*

Be it known that I, MATYAS CZINER, of Stapleton, in the county of Richmond and State of New York, have invented certain new and useful Improvements in Apparatus for Making Extracts and Distilling Liquids, of which the following is a specification.

This invention relates to certain improvements in chemical apparatus for making extracts and for distilling liquids.

The invention consists in a closed vessel divided into two compartments, the upper one of which serves for making extracts, and the lower one as a still for distilling liquids, in combination with certain devices for heating the upper chamber and charging the apparatus and discharging its contents, as more fully hereinafter specified.

In the drawing, a sectional view of the improved apparatus is represented.

The letter A indicates a cylindrical or other shaped vessel, having at its top an opening, B, which is closed by a screw-cap, C, the top of which, when it is in position, is flush with the top of the vessel A. The letter D indicates a horizontal partition in the vessel or casing A, dividing the same into two compartments, E F. From said partition, at its center, rises a goose-neck, G, from which extends downwardly a pipe, H, passing through the lower compartment, out through the side of the vessel. Said pipe connects with a two-way cock, I, which has communication with the lower compartment by means of a pipe, K. The letter I indicates a foraminous or perforated partition, located in the upper compartment of the apparatus, and the letter M a funnel at the top of the apparatus, provided with a two-way cock, $m$, and a tube, $n$, leading down through the partition of the vessel to near the bottom of the same, and a short tube, $o$, terminating in the upper compartment. The letter $N^1$ indicates a tube extending from the upper compartment downward into the lower compartment. In the upper end of said tube is located a valve, $r$, provided with a stem, $w$, extending through the side of the vessel, by means of which the liquid from the upper compartment may be supplied to the lower compartment when desired. The letter P indicates a tube extending from the upper compartment down through the lower compartment, and out through one side of the vessel. At the upper end of said tube is located a valve, R, attached to a valve-stem, S, for the purpose to be hereinafter described.

The vessel A may be supplied with water and pressure gages, and with a safety-valve, if desired.

The letter A' indicates a condenser, consisting of a cylindrical or other shaped vessel having partitions at B' and C', and provided with a series of tubes or flues, E', connecting the upper and lower portions thereof.

The upper compartment of the condenser consists of a dome, M', in which is located a coil, $N^2$, forming the termination of a pipe, O', leading from the two-way cock I. The lower coil of said pipe is perforated at its lower edge, and serves to distribute the vapor or liquid from the lower chamber of the vessel A uniformly throughout the upper compartment of the condenser, so that the vapor or liquid from the lower compartment of the vessel A will circulate uniformly through the tubes of the condenser. In case the liquid from the lower compartment of the vessel A is passed into the condenser, said condenser acts as a cooler for rapidly cooling the liquid from said lower compartment when such cooling effect is deemed necessary.

Said condenser is surrounded by a water-jacket, $F^1$, and is provided at its top with a compartment, G', for the purpose to be hereinafter explained.

The letter H' indicates a pipe or tube entering the lower portion of the water-jacket, and I' an eduction-tube extending from the same, and communicating with a tube, L', which extends from the vessel G' downwardly.

The operation of my improved apparatus is as follows: To make a simple extract the upper compartment is filled with the proper herbs and extracting menstruum, and the lower chamber supplied with water through the tube N, leading from the funnel, and heat is applied to the bottom of the apparatus. The steam passing up through the goose-neck serves to supply the necessary heat to extract the soluble portions of the herbs, and when this is accomplished the extract may be drawn off through the tube P. Should it be desired to distill the extracted matter, the valve in pipe $N^1$ is opened, allowing the extract formed in the upper compartment to flow down through the pipe into the lower compartment. The vapors then pass up through the goose-neck into the pipe H, and through the same to the condenser, where they are condensed.

The upper compartment serves to cool the vapors passing over from the still before the same enter the condenser, so that when such vapors enter the condenser their thorough condensation will be insured.

Cold water is supplied to the water-jacket $F^1$ by means of a pipe, $H'$, and to the upper compartment, $G'$, of the condenser by means of a pipe, $F^2$, leading upward from said pipe $H'$ into said upper compartment. The letter L indicates an eduction-pipe leading from the upper compartment, $G'$, and into said pipe $L'$ extends a branch pipe, $I'$, from the water-jacket $F^1$. Said pipe $L'$ and its branch $I'$ serve for the escape of water from the water-jacket and compartment $G'$.

I claim—

1. The combination, in an apparatus for making extracts and distilling liquids, of an upper and lower chamber provided with means for communicating with each other, the lower chamber being provided with a goose-neck extending into the upper chamber, down through the lower chamber, and out of the same, and a funnel provided with a two-way cock, and pipes leading respectively to the upper and lower chambers, substantially as and for the purposes specified.

2. The combination of the extract-chamber E and the still F, the former communicating with the latter by means of a valved pipe, and provided with a draw-off cock, whereby the liquid under distillation may be charged with an extract, or the process of making an extract and distillation may be conducted separately and simultaneously, substantially as specified.

3. In combination with the still, the condenser having compartments $G'$ $E'$, and provided with a two-way pipe, $H'$, whereby the upper compartment may be filled with cold water after the lower is full, substantially as described.

4. In combination with the still, the upper and lower compartments, $G'$ $E'$, provided with the two-way cold-water pipe $H'$ $F^2$, and with draw-off pipes near the top for the hot water, substantially as described.

5. In combination with the still, the condenser having an upper chamber, $G'$, and a lower chamber, $E'$, the lower chamber being provided with the condensing tube or tubes, and provided with a dome containing a worm-pipe perforated at its lower extremity, substantially as and for the purposes specified.

6. In combination with the still-chamber F and goose-neck G, the chamber $G'$, provided with a dome containing a perforated worm-pipe, the chamber E, containing the condensing tube or tubes G, I, and $E'$, the chambers being connected by a two-way pipe having outlets, and the lower collecting-chamber, substantially as described.

In testimony that I claim the foregoing I have hereunto set my hand in the presence of the subscribing witnesses.

MATYAS CZINER.

Witnesses:
CHAS. L. COOMBS,
W. E. CHAFFEE.